Figure 1:
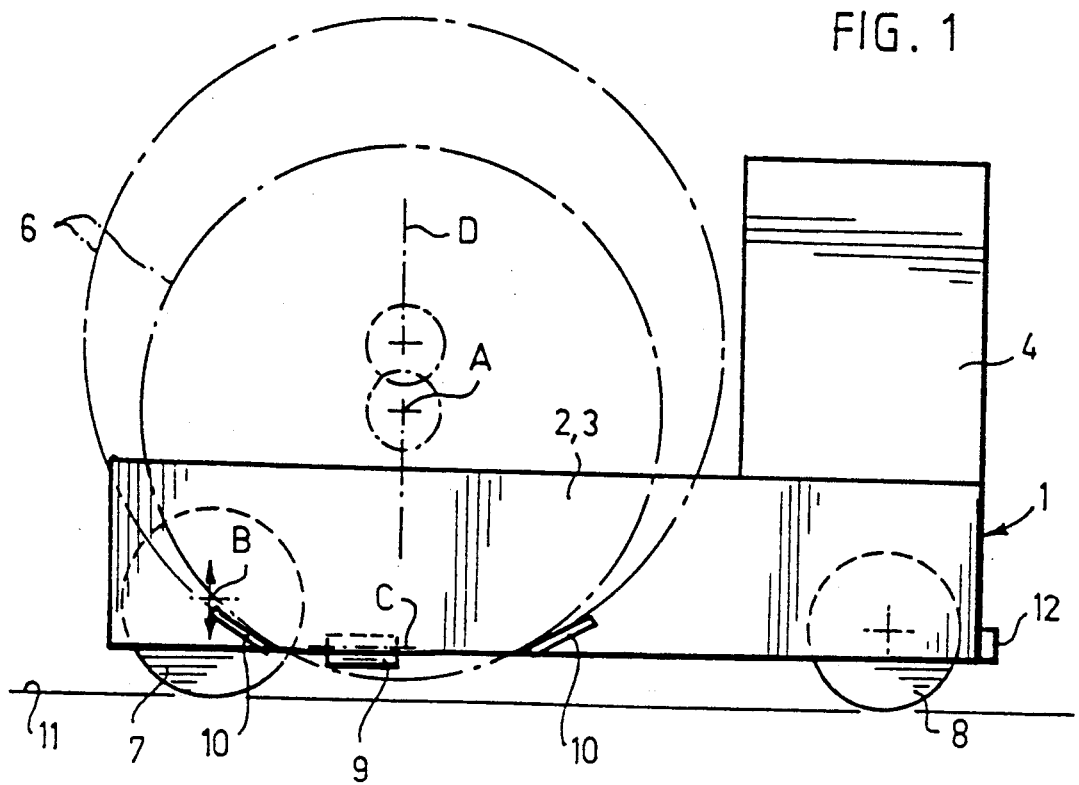

United States Patent [19]

Jääskeläinen et al.

[11] Patent Number: 5,052,877
[45] Date of Patent: Oct. 1, 1991

[54] CARRIAGE FOR THE TRANSPORTATION OF A CYLINDRICAL OBJECT

[75] Inventors: Vesa Jääskeläinen, Bro; Gustaf Linderoth, Enköping, both of Sweden

[73] Assignee: Nokia-Maillefer Holding S.A., Ecublens, Switzerland

[21] Appl. No.: 544,877

[22] Filed: Jun. 28, 1990

[30] Foreign Application Priority Data

Jul. 4, 1989 [FI] Finland ................................. 893251

[51] Int. Cl.$^5$ .............................................. B60P 3/035
[52] U.S. Cl. ..................................... 414/458; 414/911; 280/43.2; 280/79.6; 242/58.6
[58] Field of Search ............... 414/426, 427, 429, 458, 414/495, 910, 911; 280/43.2, 79.4, 79.6, 638; 242/58.6, 79

[56] References Cited

U.S. PATENT DOCUMENTS

| 3,529,736 | 9/1970 | Lebre | 214/390 |
| 3,951,287 | 4/1976 | Cofer | 414/427 |
| 4,575,303 | 3/1986 | Lindell | 414/911 X |
| 4,699,558 | 10/1987 | Hagge et al. | 414/495 X |
| 4,743,157 | 5/1988 | Takatsuki | 414/426 X |
| 4,854,803 | 8/1989 | Coccaro | 414/429 |
| 4,886,284 | 12/1989 | Martinez, Jr. | 414/429 X |

Primary Examiner—Robert J. Spar
Assistant Examiner—James Keenan
Attorney, Agent, or Firm—Finnegan, Henderson, Farabow, Garrett & Dunner

[57] ABSTRACT

A carriage for the transportation of a cable reel, comprising two parallel support elements (2, 3) which form a space between them for a reel (6) and are displaceable with respect to each other in the transverse direction (B) of the support elements, and reel supports (10) mounted on the support elements for the reel. In order to transport the reels with their central axes (A) transversely to the driving direction of the carriage so that the axes of the reels are positioned, irrespective of the size of the reels, at a constant distance from a fixed reference point (12) in the carriage, the support elements are provided with vertically displaceable carrier wheels (7) and with displacing wheels (9), the axes (C) of which extend in the longitudinal direction of the support elements. When the support elements are lowered, the displacing wheels contact the underlying surface (11) only after the reel has made contact with the surface and the reel supports have released the reel.

10 Claims, 4 Drawing Sheets

CARRIAGE FOR THE TRANSPORTATION OF A CYLINDRICAL OBJECT

The present invention relates to a carriage for the transportation of a cylindrical object, particularly a cable reel, along an underlying surface, comprising two parallel support elements, positioned at a distance from each other, said support elements forming a space between them for receiving the object and being displaceable towards and away from each other in the transverse direction of said support elements, supporting means mounted in the support elements for supporting the object to be transported, and vertically displaceable carrier wheels mounted on the support elements, the axes of said wheels extending in the transverse direction of the support elements parallel to a central axis of the object supported by the supporting means, for raising and lowering the support elements.

Although the invention will be described in the following mainly in relation to cable reels, the expression "a cylindrical object" is intended to comprise even other cylindrical objects, such as paper rolls and the like.

In the manufacture of electric cables, the cables produced are reeled on cable reels and unreeled therefrom. Known cable reeling or unreeling machines usually consist of two solid pillars which are interconnected at the top by a top beam. When a cable is reeled or unreeled, the cable reel is suspended from bearing means, which are inserted from each side of the cable reel into a central hole of said reel.

It is well known to transport cable reels by fork-lift trucks, whereby the cable reels are raised from floor level by lifting forks. Fork-lift trucks, however, transport cable reels in such a manner that the central axes of the reels are parallel to the driving direction and the central hole of one side of the reel is turned towards the lift frame of the fork-lift truck.

It is also known to transport paper rolls by automatically controlled carriages provided with two carrier wheels and a caster wheel. Even on this kind of carriage the central axis of the paper roll is, however, parallel to the direction of movement.

Such fork-lift trucks or carriages are not capable of transporting a cable reel to a position which enables the insertion of the bearing centres of cable reeling or unreeling machine into the central hole of the cable reel. The cable reel must be disposed behind or in front of the machines, and they are usually rolled to the machines manually by the staff. To roll cables manually is troublesome, as cable reels can be rather heavy. The work also involves the risk of physical injuries, as the cable reels can begin to move faster than is intended, and it can be difficult to stop them. It is not possible to effect automatic transportation and automatic handling of cable reels to cable reeling or unreeling machines by the fork-lift trucks or carriages mentioned above.

It is also known to transport cable reels by a carriage so that the central axis of the reel is perpendicular to the direction of movement, but in this case the cable reels must be lifted on and off the carriage by a separate hoisting apparatus.

It is also known to transport cable reels by a carriage so that the axis of the reel is perpendicular to the direction of movement, whereby the reel is supported at the bottom part thereof by a platform or a platform-like frame.

It is possible to release cable reels by carriages of this kind into cable reeling or unreeling machines, but if the reels must be lifted on and off the carriage by a separate apparatus, the handling becomes complicated and expensive. If it is necessary to use platforms, new problems arise because each cable reel must be provided with a platform or a platform-like frame, which entails high costs. Many machines cannot handle both a cable reel and a platform, which leads to a problem with the storage of empty platforms.

In one type of carriage for transporting cable reels so that the axis of the reel is perpendicular to the main direction of movement, it is possible to adjust the width of the carriage to fit the width of different cable reels, but the carriage requires broad wheels and rotatable auxiliary carrier wheels. These wheels require so much room in the lateral direction that the carriage is not suitable for transporting a cable reel to and from conventional cable reeling and unreeling machines, unless they are made awkwardly large.

Moreover, known carriages of this kind lift cable reels of different sizes from the floor in such a manner that the central axes of the cable reels are positioned at different distances from the front of the carriage in its main direction of movement. This is a significant disadvantage in automatic reel handling systems, wherein the central axis of a reel must be aligned with the bearing means of the cable reeling or unreeling machines, and automatic carriages usually locate their position on the basis of a parking plate or the like attached to the floor.

U.S. Pat. No. 3,529,736 discloses a carriage for the transportation of heavy objects. Said carriage comprises two parallel support elements positioned at a distance from each other, and supporting means mounted in the support elements for the object to be transported. The support elements are provided with wheels which are displaceable in vertical direction and the axes of which are positioned in the longitudinal direction of the support elements for raising and lowering the support elements.

By means of a carriage of this kind, objects can indeed be loaded into the carriage on the support elements and unloaded therefrom without any separate hoisting apparatus. However, the loading and unloading always requires that the carriage is driven in its direction of movement under the object and correspondingly away from under the object, i.e. that the entire carriage is always moved with respect to the object.

The purpose of the present invention is to avoid the difficulties stated above and to provide a carriage which can automatically lift up and set down cylindrical objects of different sizes, for instance, transport cable reels to a storage room for reels or to reeling and unreeling machines so that the central axis of the object is perpendicular to the direction of movement, without having to move the entire carriage with respect to the object. This purpose is achieved by means of a carriage according to the invention, which is characterized in that the support elements are provided with displacing wheels, the axes of which are perpendicular to the axes of the carrier wheels, said displacing wheels supporting the support elements in a raised position of said carrier wheels for displacing the support elements in the axial direction of said carrier wheels, whereby the supporting means are mounted with respect to the displacing wheels in such a manner that the circumference of the object carried by the supporting means contacts the underlying surface before the displacing wheels make contact with said surface when the carrier wheels are lifted from contact with said surface.

The invention is based on the idea that the support elements of the carriage are made displaceable perpendicularly to the longitudinal direction of the support elements, i.e. in the axial direction of the carried object, in such a manner that the carriage can grip the object at each end plate thereof and also release the object by displacing the support elements towards and away from each other, respectively. This renders it possible to mount the supporting means in the support elements at a fixed distance, on one hand, from each other and, on the other hand, from a fixed reference point in the carriage. This ensures that the central axes of cylindrical objects of different sizes are always positioned in one and the same vertical plane on the carriage and thus always at the same distance from a reference point in the carriage. The movements of the carriage can thus be automatically controlled to displace an object to or from an accurate central axis position with respect to a machine, storage room or the like. This results in simple parking devices in automatic reel handling systems.

Figure 2:
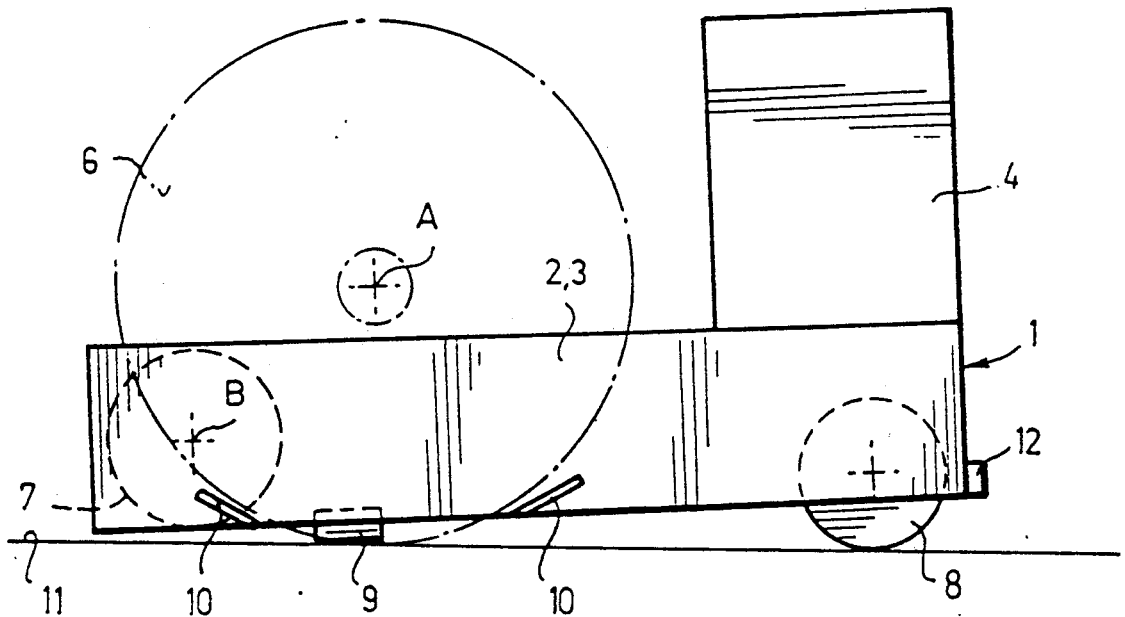
Figure 3:
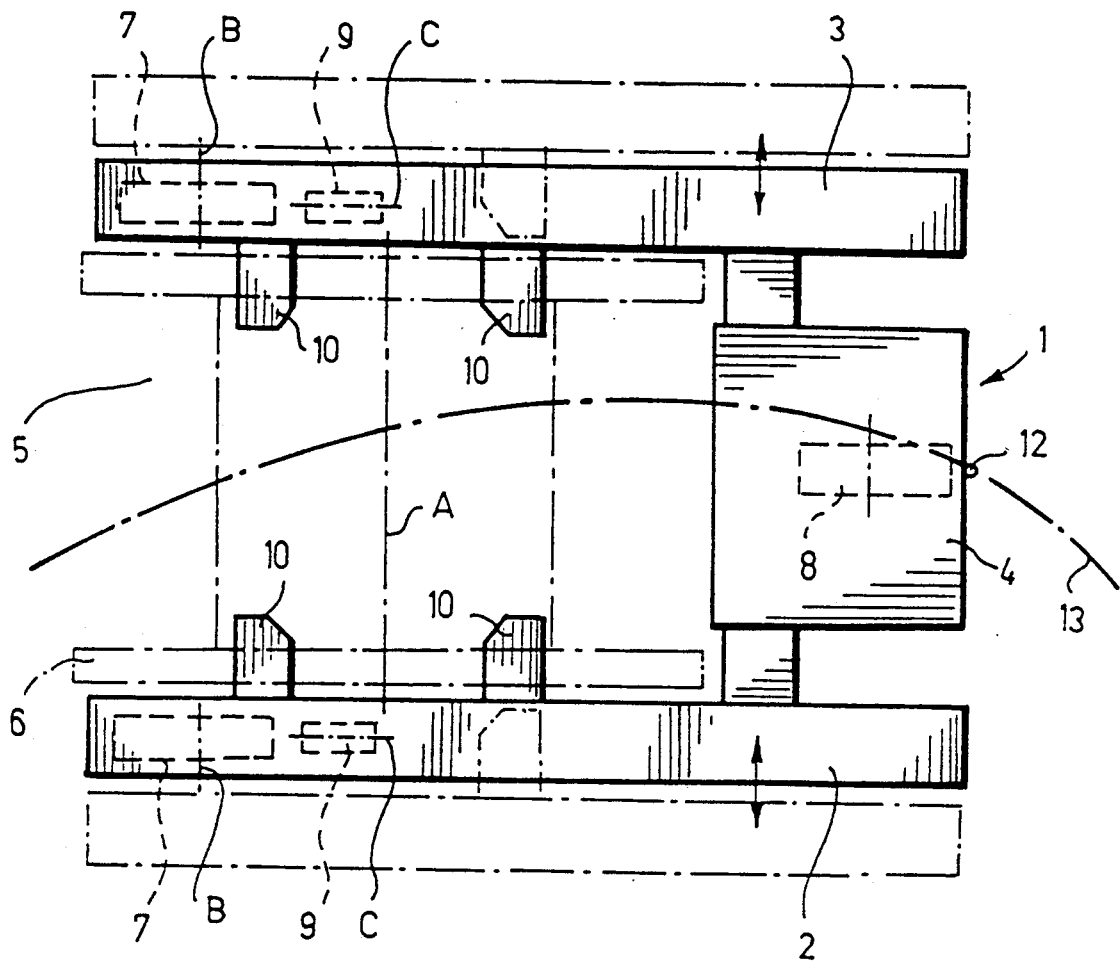
Figure 4:
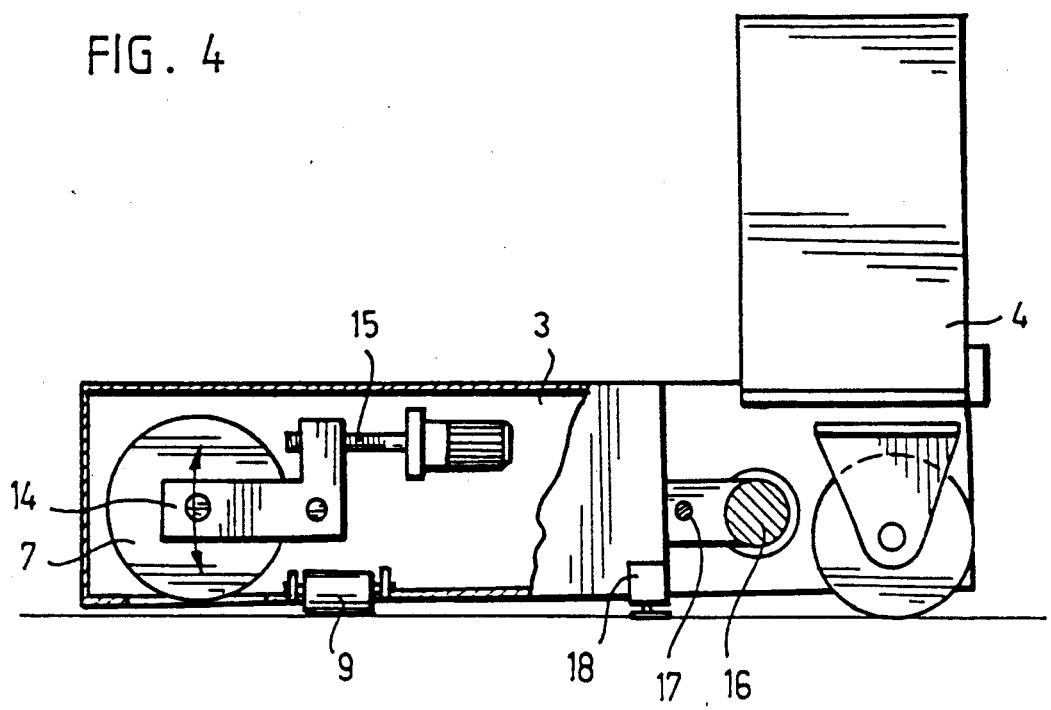
Figure 5:
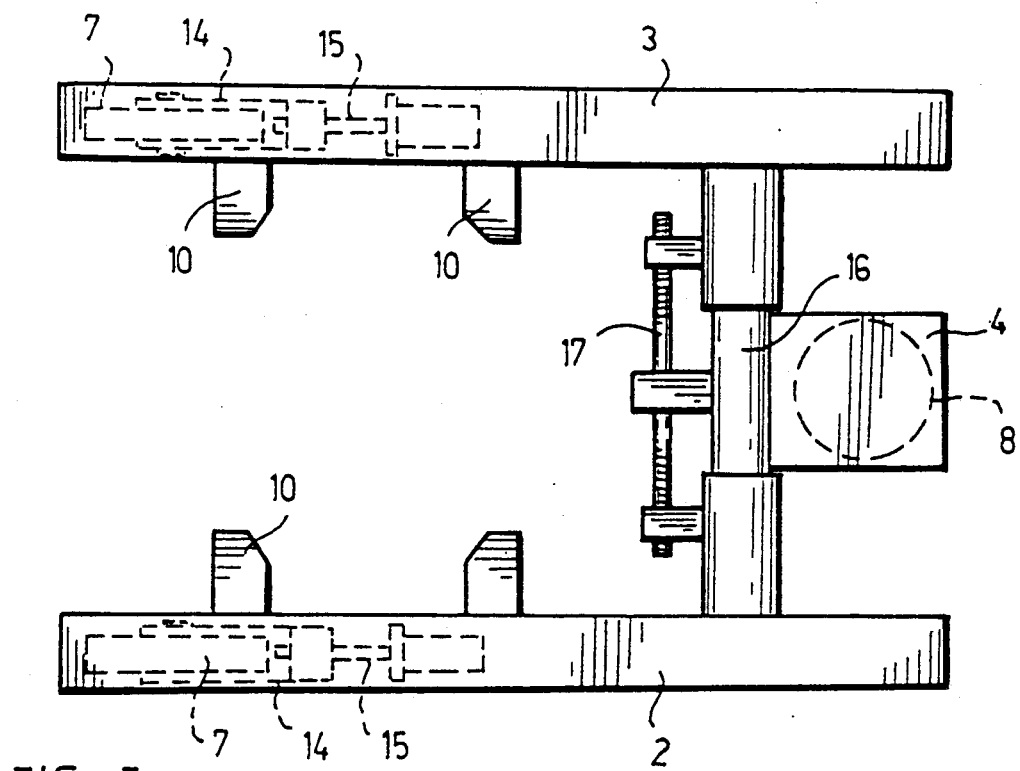
Figure 6:
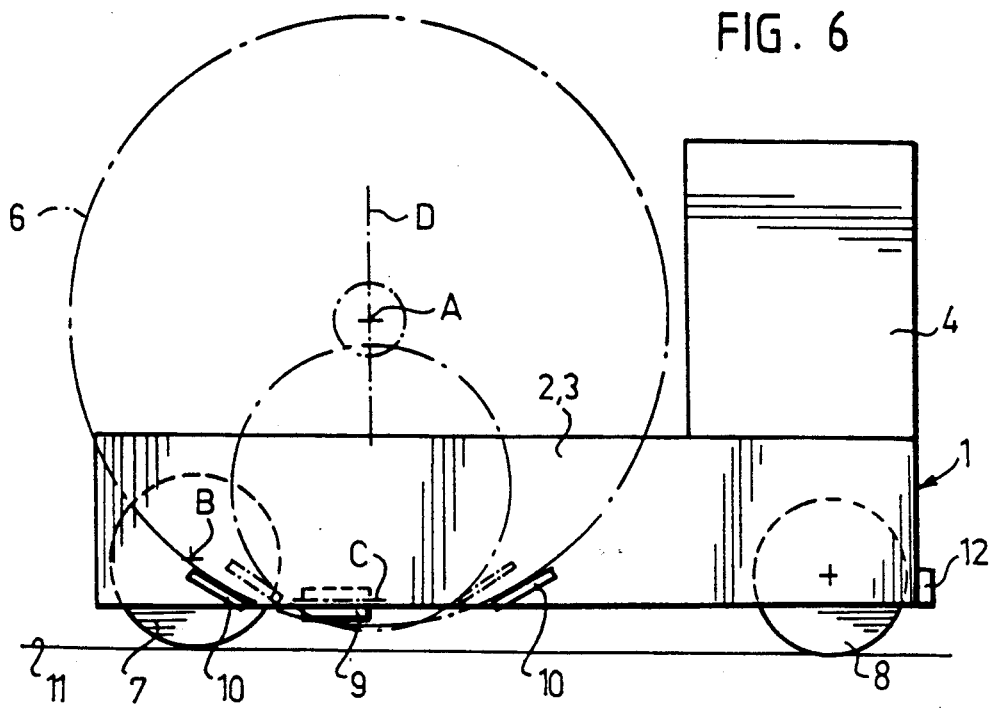
Figure 7:
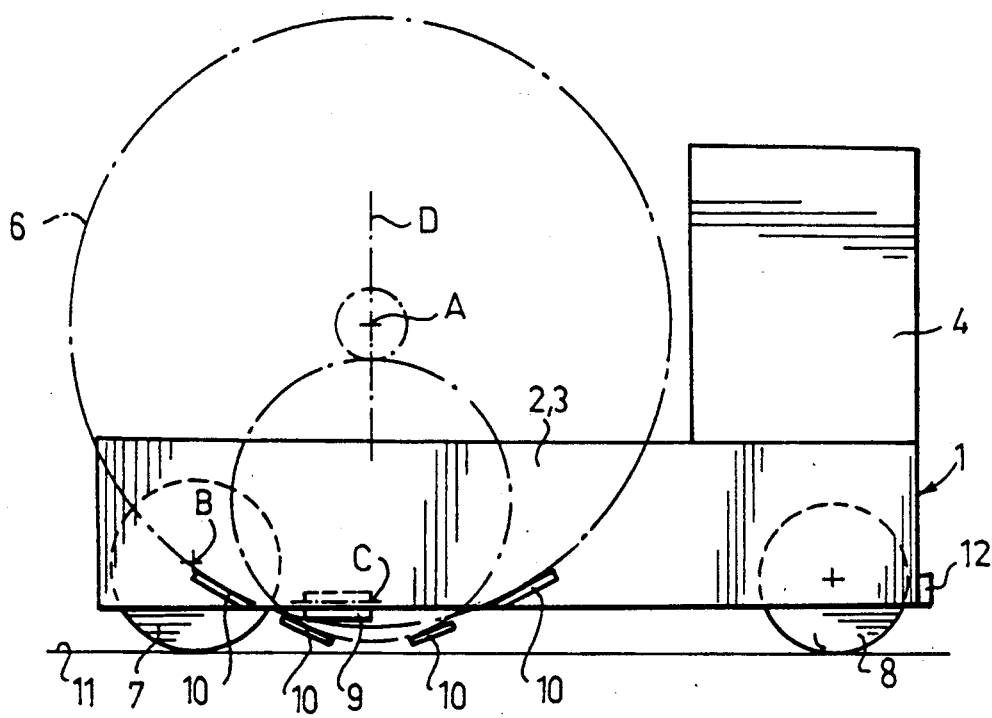

In the following the invention will be described in greater detail with reference to the attached drawings, wherein FIGS. 1 to 3 are schematic views of the operating principles of a preferred embodiment of a carriage according to the invention, FIGS. 1 and 2 being side views of the carriage in a transporting position and in a loading or unloading position, respectively, and FIG. 3 showing the carriage seen from above, and FIGS. 4 and 5 show certain constructions in the carriage seen from the side, partly sectionally, and correspondingly from above, and FIGS. 6 and 7 are side views of two other preferred embodiments of the invention.

The carriage illustrated by FIGS. 1 to 5 has a substantially U-shaped frame 1, comprising two parallel, horizontal support elements 2 and 3, and a central member 4. The support elements form a space 5 between them for receiving a cable reel 6 so that the central axis A of the reel is perpendicular to the longitudinal axis of the support elements and thus perpendicular also to the driving direction of the carriage.

Each support element is provided with a carrier wheel 7 mounted on the support element vertically displaceably, and the central member is provided with a caster wheel 8 rotatable around a vertical axis. The axes B of the carrier wheels are perpendicular to the longitudinal direction of the support elements and thus parallel to the central axis of the reel.

Moreover, each support element is provided with a displacing wheel 9, mounted on the support member so as to be rotatable around a horizontal axis C, which extends in the longitudinal direction of the support member and is perpendicular to the axis of the carrier wheel and to the central axis of the reel.

Each support element is, in addition, provided with two supporting means, directed towards the other support element and projecting into the space between the elements. Said means consist of horizontal lifting plates 10 and are fastened rigidly to the support elements at a fixed distance from each other.

The support elements 2 and 3 are mounted displaceably on the central member in such a manner that the support elements can be displaced towards and away from each other while maintaining their mutually parallel positions.

In the transporting position of the carriage the carrier wheels are turned down so that the end plates of a cable reel rest on the lifting plates 10 and the reel has been lifted from contact with the floor 11. The carriage can now be driven automatically in different directions, for example, along a line arranged on the floor in advance, whereby a sensor 12 is appropriately mounted in the central member for automatic searching of guiding loops 13 disposed at floor level, FIG. 3.

In order to release a cable reel, the carrier wheels are raised upwards with respect to the support elements in such a manner that both the support elements and the lifting plates descend. The lifting plates and the displacing wheels are thereby disposed at such heights with respect to each other and the carrier wheels that the end plates of the cable reel come in contact with the floor level before the displacing wheels. On account of this, the lifting plates will further descend when the cable reel has made contact with the floor until the descending motion stops once the displacing wheels have come in contact with the floor level. Thus, the lifting plates are released from the cable reel.

After the support elements have been lowered, they can be moved away from each other by rolling on the displacing wheels. Thus, the lifting plates are drawn away from the cable reel and are finally situated beyond the width of the cable reel so that the lifting plates are no longer in contact with the reel when the carriage is driven away from the cable reel. When a cable reel is fetched, these measures are performed in reverse order.

In the carriage disclosed the lifting plates are fastened rigidly to the support members, wherefore the central axis of a cable reel is always situated in the same vertical plane D irrespective of the size of the reel. This vertical plane is, in turn, situated substantially at a constant distance from a fixed reference point in the carriage, for instance from the sensor 12, since the descending motion of the support elements is relatively small.

In the embodiments illustrated by FIGS. 4 and 5, the carrier wheels 7 are mounted on the support elements by means of a lever arm 14, which is vertically pivotable by means of a motor-driven adjusting screw 15.

The support elements are mounted displaceably on a bar 16 attached to the central member and can be displaced by means of a motor-driven adjusting screw 17.

A brake 18 is mounted in the central member. Said brake can be pressed against the floor for keeping the carriage stable in a desired position when displacing the support elements towards or away from each other.

The lifting plates 10 are advantageously trapezoidal or provided with oblique angles, which facilitates the placement thereof under a cable reel and allows a certain parking error in the longitudinal direction of the carriage.

FIG. 6 shows an embodiment wherein the supporting means, i.e. the lifting plates 10, are mounted displaceably in the longitudinal direction of the support elements. The lifting plates are disposed in pairs at a distance from each other, and they can be moved towards and away from each other in such a manner that the vertical centre line D, extending perpendicularly to the longitudinal direction of the support elements, remains at a constant distance in the axial direction of the displacing wheels 9 from a fixed reference point in the carriage, for example, from the sensor 12. FIG. 6 shows by solid lines one position of the lifting plates, suitable for large reels, and by broken lines another position thereof, suitable for considerably smaller reels.

FIG. 7 shows an embodiment, wherein the supporting means consist of four lifting plates 10 in each support element. The lifting plates project into the space 5 between the support elements and are disposed in pairs at a constant distance from each other in the longitudinal direction of the support elements and at a constant distance in the axial direction of the displacing wheels from the fixed reference point 12 in the carriage. In this embodiment, two pairs of lifting plates are thus used: the outer pair when transporting large reels and the inner pair when transporting smaller reels. The outer pair can be larger and stronger as large reels are heavy. Small reels do not need as large and strong lifting plates, wherefore it is possible to use small lifting plates, which do not require as much room in the vertical direction. Thus, the carriage lifts large reels to a slightly higher level than small reels, see FIG. 7.

The drawings and the description relating thereto are intended merely to illustrate the idea of the invention. In its details, the carriage can vary within the scope of the claims. Those parts of the carriage that are movable with respect to each other can be displaced even otherwise, for example, by means of pressure fluid cylinders, guide chains or the like.

We claim:

1. A carriage for the transportation of a cylindrical object having a central axis (A) along an underlying surface, comprising two parallel support elements (2, 3) positioned at a distance from each other and extending in a longitudinal direction, said support elements forming a space (5) between them for receiving the object (6) and being displaceable towards and away from each other transversely to the longitudinal direction of said support elements, supporting means (10) mounted in the support elements for supporting the object to be transported, and vertically displaceable carrier wheels (7) mounted on the support elements, said wheels being rotatable about axes (B), said axes (B) extending in a direction transverse to the longitudinally extending support elements and being parallel to said central axis (A) of the object (6) supported by the supporting means (10), for raising and lowering the support elements, the support elements (2, 3) being provided with displacing wheels (9), each rotatable about respective axes (C) which are perpendicular to said axes (B) of the carrier wheels, said displacing wheels supporting the support elements in a raised position of said carrier wheels for facilitating transverse displacement of the support elements, whereby the supporting means (10) are mounted with respect to the displacing wheels (9) in such a manner that the said object carried by the supporting means contacts the underlying surface (11) before the displacing wheels make contact with said surface when the carrier wheels are elevated relative to the support elements to a position where they are out of contact with said surface.

2. A carriage according to claim 1, characterized in that the support elements (2, 3) are interconnected by a central member (4) provided with a wheel (8) and are symmetrically displaceable with respect to the central member in the axial direction (B) of the carrier wheels.

3. A carriage according to claim 1, characterized in that the supporting means (10) are mounted in the support elements (2, 3) at a constant distance in the axial direction (C) of the displacing wheels (9) from a fixed reference point (12) in the carriage.

4. A carriage according to claim 3, characterized in that the supporting means (10) consist of at least two lifting plates in each support element (2, 3), said lifting plates projecting into the space (5) between the support elements and being disposed in pairs at a constant distance from each other in the longitudinal direction of the support elements.

5. A carriage according to claim 3 or 4, characterized in that the lifting plates (10) are fastened rigidly to the support elements (2, 3).

6. A carriage according to claim 1 or 2, characterized in that the supporting means (10) consist of at least two lifting plates in each support elements (2, 3), said lifting plates projecting into the space (5) between the support elements and being disposed in pairs at a distance from each other and mounted displaceably in the longitudinal direction of the support elements for displacing the supporting means towards and away from each other in such a manner that a vertical centre line (D), extending perpendicularly to the longitudinal direction of the support elements, is situated at a constant distance in the axial direction (C) of the displacing wheels (9) from a fixed reference point (12) in the carriage.

7. A carriage according to claim 2, characterized in that the support elements (2, 3) are mounted on the central member (4) displaceably in the axial direction (B) of the carrier wheels (7) and connected to displacing means (17) fastened to the central member for displacing the support elements.

8. A carriage according to claim 7, characterized in that the displacing means comprise a transversely extending screw rod (17) fastened stationarily in the central member (4) and connected to a rotating power means.

9. A carriage according to claim 1, characterized in that the carrier wheels (7) are mounted on the support elements (2, 3) by means of lever arms (14) which are vertically pivotable and connected to power means (15) for displacing the central axes (B) of the carrier wheels substantially vertically.

10. A carriage according to claim 2, characterized by a brake (18) mounted in the central member (4), said brake being displaceable to make contact with the underlying surface (11) prior to the raising of the carrier wheels (7).

* * * * *